US012205515B2

(12) United States Patent
Liu

(10) Patent No.: US 12,205,515 B2
(45) Date of Patent: Jan. 21, 2025

(54) DISPLAY DEVICE AND SIGNAL DELAY ADJUSTMENT DEVICE THEREOF

(71) Applicant: TCL CHINA STAR OPTOELECTRONICS TECHNOLOGY CO., LTD., Shenzhen (CN)

(72) Inventor: Jinfeng Liu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/272,222

(22) PCT Filed: Dec. 31, 2020

(86) PCT No.: PCT/CN2020/142317

§ 371 (c)(1),
(2) Date: Sep. 17, 2023

(87) PCT Pub. No.: WO2022/141469

PCT Pub. Date: Jul. 7, 2022

(65) Prior Publication Data

US 2024/0005840 A1 Jan. 4, 2024

(30) Foreign Application Priority Data

Dec. 30, 2020 (CN) ......................... 202011605928.4

(51) Int. Cl.
*G09G 3/20* (2006.01)

(52) U.S. Cl.
CPC ... *G09G 3/2096* (2013.01); *G09G 2320/0223* (2013.01); *G09G 2320/0242* (2013.01)

(58) Field of Classification Search
CPC .................. G09G 3/2096; G09G 3/20; G09G 2320/0223; G09G 2320/0242; G09G 2300/0426
See application file for complete search history.

(56) References Cited

U.S. PATENT DOCUMENTS

2018/0158395 A1* 6/2018 Chang ...................... G09G 3/20
2020/0273407 A1* 8/2020 Hu ....................... G09G 3/3688

FOREIGN PATENT DOCUMENTS

CN 106782275 A 5/2017
CN 107978291 A 5/2018
CN 109166515 A 1/2019
CN 109473075 A 3/2019

* cited by examiner

*Primary Examiner* — Brent D Castiaux
(74) *Attorney, Agent, or Firm* — PV IP PC; Wei Te Chung

(57) ABSTRACT

The present disclosure provides a signal delay adjustment device for a display device, which enables a fan-out delay duration of all fan-out wires to be substantially same, so that at a same time, pixel brightness of all pixels controlled by the fan-out wires in a fan-out area is substantially same because applied voltages are substantially same, thereby improving uniformity of the display device and preventing occurrences of color deviation.

16 Claims, 5 Drawing Sheets

DISPLAY DEVICE AND SIGNAL DELAY ADJUSTMENT DEVICE THEREOF

FIELD OF INVENTION

The present disclosure relates to the field of display technology and more particularly to a display device and a signal delay adjustment device thereof.

BACKGROUND OF INVENTION

Output wires from a source driving chip (source driving IC) of a display device to data lines in a display area need to be layout processed in a manner in which a fan-out area layout is performed. Referring to FIG. 1, FIG. 1 is a schematic diagram of a fan-out area of a display device. For the same source driving chip, distances from the output wires to the data lines in the display area are unequal, so lengths of output wires in the fan-out area (fan-out wires) are different; that is, impedance is inconsistent, thereby causing different degrees of capacitance resistance delay (RC delay) among all fan-out wires, eventually resulting in different effective charging times of pixels driven by each data line on a same scan line, thereby causing a phenomenon that a brightness of a control area of one source driving chip is high in a middle area while low at both ends, i.e., a color deviation phenomenon caused by color unevenness.

Therefore, there is an urgent need for a compensation device that can effectively solve the phenomenon of color deviation caused by different lengths of fan-out wires of source drivers of display devices, so as to improve display uniformity of display devices.

Technical Problem

Current display devices cause color deviation due to different lengths of the fan-out wires of the source driver.

Technical Solutions

In order to solve the above problem, a signal delay adjustment device of a display device is provided in an embodiment of the present disclosure, wherein the signal delay adjustment device is connected to a source driving chip of the display device and is configured to adjust a time at which the source driving chip outputs data signals through a plurality of fan-out wires in a fan-out area of the display device, respectively; the signal delay adjustment device comprises a delay detection module, a gear setting module, and a delay control module sequentially connected;

The delay detection module is configured to detect a fan-out delay duration of the fan-out wire at the outermost of the fan-out area and a fan-out delay duration of the fan-out wire in the middle of the fan-out area, and acquire a maximum fan-out compensation duration of the fan-out area according to a difference between the fan-out delay duration of the fan-out wire at the outermost and the fan-out delay duration of the fan-out wire in the middle of the fan-out area; wherein the fan-out delay duration is a duration required for the fan-out wire to reach a target voltage from an initial voltage;

The gear setting module is configured to set and select a fan-out adjustment gear required according to the maximum fan-out compensation duration and a number of fan-out wires;

The delay control module is configured to acquire a fan-out compensation duration required by each fan-out wire according to a gear adjustment duration required corresponding to the fan-out adjustment gear, and delay a time at which each fan-out wire outputs a data signal according to the fan-out compensation duration of each fan-out wire, so that the fan-out delay durations of all fan-out wires are the same.

In some embodiments, the delay detection module is further configured to detect a start time of a pixel turned on earliest and a start time of a pixel turned on latest in a row of pixels controlled by each scan line, and acquire a maximum start compensation duration of the fan-out area based on a time difference between the start time of the pixel opened latest and the start time of the pixel opened earliest of the scan line.

In some embodiments, wherein the gear setting module is further configured to set and select a start adjustment gear required according to the maximum start compensation duration and the number of fan-out wires.

In some embodiments, the delay control module is further configured to obtain a start compensation duration of each fan-out wire according to a gear adjustment duration corresponding to the start adjustment gear, before compensating the fan-out delay duration of the fan-out wire, and delay a time at which each fan-out wire outputs a data signal according to the start compensation duration of each fan-out wire, so that after all pixels controlled by all fan-out wires are turned on by each scan line, all fan-out wires start to output data signals.

In some embodiments, a relationship between the maximum fan-out compensation duration and the fan-out adjustment gear is as follows:

$$t=n*ui*\text{gear}$$

Where t is the maximum fan-out compensation duration, n is the number of fan-out wires, ui is an unit fan-out delay duration, gear is a fan-out adjustment gear, and ui*gear is the gear adjustment duration corresponding to the fan-out adjustment gear;

A relationship between the maximum start compensation duration and the start adjustment gear is as follows:

$$t'=n*ui'*\text{gear}$$

Where t' is the maximum start compensation duration, n is the number of fan-out wires, ui' is the unit start delay duration, gear' is the start adjustment gear, and ui'*gear is the gear adjustment duration corresponding to the start adjustment gear.

In some embodiments, the gear setting module sets and selects the fan-out adjustment gear required according to the maximum fan-out compensation duration and the number of fan-out wires, specifically comprising:

Setting the unit fan-out delay duration according to a data transmission period of the data signal;

Setting a plurality of fan-out adjustment gears and the gear adjustment duration of each of the fan-out adjustment gears according to the unit fan-out delay duration;

Determining a maximum fan-out adjustment duration corresponding to each fan-out adjustment gear according to the gear adjustment duration corresponding to each fan-out adjustment gear and the number of fan-out wires; and Selecting the fan-out adjustment gear corresponding to the maximum fan-out adjustment duration that is same as the maximum fan-out compensation duration as the fan-out adjustment gear required.

In some embodiments, the gear setting module sets and selects the start adjustment gear required according to the maximum start compensation duration and the number of fan-out wires, specifically comprising:

Setting the unit start delay duration according to the data transmission period of the data signal;

Setting a plurality of the start adjustment gears and the gear adjustment duration corresponding to each start adjustment gear according to the unit start delay duration;

Determining a maximum start adjustment duration corresponding to each start adjustment gear based on the gear adjustment duration corresponding to each start adjustment gear and the number of fan-out wires; and Selecting the start adjustment gear corresponding to the maximum start adjustment duration that is same as the maximum start compensation duration as the start adjustment gear required.

In some embodiments, the gear setting module comprises a parameter setting unit and a gear selecting unit connected to each other, The parameter setting unit is configured to control gear parameters corresponding to an output of a plurality of output pins through a plurality of pairs of independent pull-up resistors and pull-down resistors connected in parallel;

The gear selection unit is configured to perform a binary conversion to decimal operation based on a plurality of the gear parameters to acquire and select the fan-out adjustment gear and the start adjustment gear required.

In some embodiments, the gear setting module further comprises a voltage generating unit for outputting a fixed voltage;

One end of the pull-up resistor and one end of the pull-down resistor in each pair are respectively connected to corresponding output pins, the other end of the pull-up resistor is connected to an output end of the voltage generating unit, and the other end of the pull-down resistor is grounded.

In some embodiments, the delay control module comprises a unit delay duration unit, a gear adjustment duration unit, and a delay control unit connected in sequence;

The unit delay duration unit is configured to set a unit fan-out delay duration and a unit start delay duration;

The gear adjustment duration unit is configured to acquire a gear adjustment duration corresponding to the fan-out adjustment gear according to the unit fan-out delay duration and the fan-out adjustment gear, and to acquire a gear adjustment duration corresponding to the start adjustment gear according to the unit start delay duration and the start adjustment gear; and The delay control unit is configured to acquire the start compensation duration of each fan-out wire according to the gear adjustment duration corresponding to the start adjustment gear, delay a time at which each fan-out wire outputs the data signal according to the start compensation duration of each fan-out wire, and acquire the fan-out compensation duration of each fan-out wire according to the gear adjustment duration corresponding to the fan-out adjustment gear, and delay the time at which each fan-out wire outputs the data signal according to the fan-out compensation duration of each fan-out wire.

In addition, an embodiment of the present disclosure further provides a display device comprising a signal delay adjustment device, wherein the signal delay adjustment device is connected to a source driving chip of the display device and is configured to adjust a time at which the source driving chip outputs data signals through a plurality of fan-out wires in a fan-out area of the display device, respectively; the signal delay adjustment device comprises a delay detection module, a gear setting module, and a delay control module sequentially connected;

The delay detection module is configured to detect a fan-out delay duration of the fan-out wire at the outermost of the fan-out area and a fan-out delay duration of the fan-out wire in the middle of the fan-out area, and acquire a maximum fan-out compensation duration of the fan-out area according to a difference between the fan-out delay duration of the fan-out wire at the outermost and the fan-out delay duration of the fan-out wire in the middle of the fan-out area; wherein the fan-out delay duration is a duration required for the fan-out wire to reach a target voltage from an initial voltage;

The gear setting module is configured to set and select a fan-out adjustment gear required according to the maximum fan-out compensation duration and a number of fan-out wires;

The delay control module is configured to acquire a fan-out compensation duration required by each fan-out wire according to a gear adjustment duration required corresponding to the fan-out adjustment gear, and delay a time at which each fan-out wire outputs a data signal according to the fan-out compensation duration of each fan-out wire, so that the fan-out delay durations of all fan-out wires are the same.

In some embodiments, the delay detection module is further configured to detect a start time of a pixel turned on earliest and a start time of a pixel turned on latest in a row of pixels controlled by each scan line, and acquire a maximum start compensation duration of the fan-out area based on a time difference between the start time of the pixel opened latest and the start time of the pixel opened earliest of the scan line.

In some embodiments, the gear setting module is further configured to set and select a start adjustment gear required according to the maximum start compensation duration and the number of fan-out wires.

In some embodiments, the delay control module is further configured to obtain a start compensation duration of each fan-out wire according to a gear adjustment duration corresponding to the start adjustment gear, before compensating the fan-out delay duration of the fan-out wire, and delay a time at which each fan-out wire outputs a data signal according to the start compensation duration of each fan-out wire, so that after all pixels controlled by all fan-out wires are turned on by each scan line, all fan-out wires start to output data signals.

In some embodiments, a relationship between the maximum fan-out compensation duration and the fan-out adjustment gear is as follows:

$$t=n*ui*\text{gear}$$

Where t is the maximum fan-out compensation duration, n is the number of fan-out wires, ui is an unit fan-out delay duration, gear is a fan-out adjustment gear, and ui*gear is the gear adjustment duration corresponding to the fan-out adjustment gear;

A relationship between the maximum start compensation duration and the start adjustment gear is as follows:

$$t'=n*ui'*\text{gear}$$

Where t' is the maximum start compensation duration, n is the number of fan-out wires, ui' is the unit start delay duration, gear' is the start adjustment gear, and ui'*gear is the gear adjustment duration corresponding to the start adjustment gear.

In some embodiments, the gear setting module sets and selects the fan-out adjustment gear required according to the maximum fan-out compensation duration and the number of fan-out wires, specifically comprising:

Setting the unit fan-out delay duration according to a data transmission period of the data signal;

Setting a plurality of fan-out adjustment gears and the gear adjustment duration of each of the fan-out adjustment gears according to the unit fan-out delay duration;

Determining a maximum fan-out adjustment duration corresponding to each fan-out adjustment gear according to the gear adjustment duration corresponding to each fan-out adjustment gear and the number of fan-out wires; and Selecting the fan-out adjustment gear corresponding to the maximum fan-out adjustment duration that is same as the maximum fan-out compensation duration as the fan-out adjustment gear required.

In some embodiments, the gear setting module sets and selects the start adjustment gear required according to the maximum start compensation duration and the number of fan-out wires, specifically comprising:

Setting the unit start delay duration according to the data transmission period of the data signal;

Setting a plurality of the start adjustment gears and the gear adjustment duration corresponding to each start adjustment gear according to the unit start delay duration;

Determining a maximum start adjustment duration corresponding to each start adjustment gear based on the gear adjustment duration corresponding to each start adjustment gear and the number of fan-out wires; and Selecting the start adjustment gear corresponding to the maximum start adjustment duration that is same as the maximum start compensation duration as the start adjustment gear required.

In some embodiments, the gear setting module comprises a parameter setting unit and a gear selecting unit connected to each other, The parameter setting unit is configured to control gear parameters corresponding to an output of a plurality of output pins through a plurality of pairs of independent pull-up resistors and pull-down resistors connected in parallel;

The gear selection unit is configured to perform a binary conversion to decimal operation based on a plurality of the gear parameters to acquire and select the fan-out adjustment gear and the start adjustment gear required.

In some embodiments, the gear setting module further comprises a voltage generating unit for outputting a fixed voltage;

One end of the pull-up resistor and one end of the pull-down resistor in each pair are respectively connected to corresponding output pins, the other end of the pull-up resistor is connected to an output end of the voltage generating unit, and the other end of the pull-down resistor is grounded.

In some embodiments, the delay control module comprises a unit delay duration unit, a gear adjustment duration unit, and a delay control unit connected in sequence;

The unit delay duration unit is configured to set a unit fan-out delay duration and a unit start delay duration;

The gear adjustment duration unit is configured to acquire a gear adjustment duration corresponding to the fan-out adjustment gear according to the unit fan-out delay duration and the fan-out adjustment gear, and to acquire a gear adjustment duration corresponding to the start adjustment gear according to the unit start delay duration and the start adjustment gear; and The delay control unit is configured to acquire the start compensation duration of each fan-out wire according to the gear adjustment duration corresponding to the start adjustment gear, delay a time at which each fan-out wire outputs the data signal according to the start compensation duration of each fan-out wire, and acquire the fan-out compensation duration of each fan-out wire according to the gear adjustment duration corresponding to the fan-out adjustment gear, and delay the time at which each fan-out wire outputs the data signal according to the fan-out compensation duration of each fan-out wire.

Beneficial Effect

An embodiment of the present disclosure provides a display device and a signal delay adjustment device thereof. The signal delay adjustment device detects a fan-out delay duration of a fan-out wire at the outermost of a fan-out area and a fan-out delay duration of a fan-out wire in the middle of the fan-out area through a delay detection module, obtains a maximum fan-out compensation duration of the fan-out area according to a difference between the fan-out delay duration of the fan-out wire at the outermost and the fan-out delay duration of the fan-out wire in the middle, then sets and selects a required fan-out adjustment gear according to the maximum fan-out compensation duration through a gear setting module, finally obtains a fan-out compensation duration required for each fan-out wire through a delay control module according to a gear adjustment duration corresponding to the required fan-out adjustment gear, and delays a time at which each fan-out wire outputs a data signal according to the fan-out compensation duration required for each fan-out wire, in order to compensate the fan-out delay duration of each fan-out wire so that the fan-out delay duration of all fan-out wires are the same. The signal delay adjustment means enables the fan-out delay duration of all the fan-out wires to be substantially the same, so that at the same time, the brightness of all the pixels controlled by the fan-out wires in the fan-out area is substantially the same since the applied voltages are substantially the same, thereby improving the uniformity of the display device and preventing the occurrence of color deviation.

DETAILED DESCRIPTION OF PREFERRED EMBODIMENTS

In order that the objects, technical solutions, and effects of the present disclosure may be made clearer and clearer, the present disclosure will be described in further detail below with reference to the accompanying drawings, which illustrate by way of example only. It is to be understood that the specific embodiments described herein are merely illustrative of the present disclosure and are not intended to limit the present disclosure.

At present, since size and resolution of a display panel are continuously improved, the number of source driving chips used is controlled or reduced as much as possible in consideration of cost and transmission rate, and a manner in which output channels of each source driving chip is reduced and the number of the source driving chips is increased to alleviate the color deviation phenomenon cannot be used.

For a display device using a double-gate transistor architecture, one output channel of the source driving chip is connected to two adjacent columns of sub-pixels, and gate switches of the two columns of sub-pixels are controlled to be turned on alternately in a display time of one row, so that one output channel of the source driving chip can drive the two columns of sub-pixels in a time-sharing and multiplex manner; that is, the number of gate driving chips is doubled, and the number of the source driving chips is decreased by ½, thereby saving ½ of the number of the source driving chips. Similarly, for a display device using a three-dimensional transistor (Tri-gate) architecture, the number of the gate driving chips is tripled, and the number of the source driving chips is decreased to ⅓, thereby saving ⅔ of the number of the source driving chips. Although the number of the source driving chips can be minimized in the display devices of the above two configurations, an area of a control area of each source driving chip is greatly increased, resulting in serious color deviation.

Therefore, there is an urgent need to solve the technical problem of color deviation caused by different lengths of fan-out wires of a source driver in a display device. Based on this, an embodiment of the present disclosure provides a signal delay adjustment device of a display device.

Figure 1:
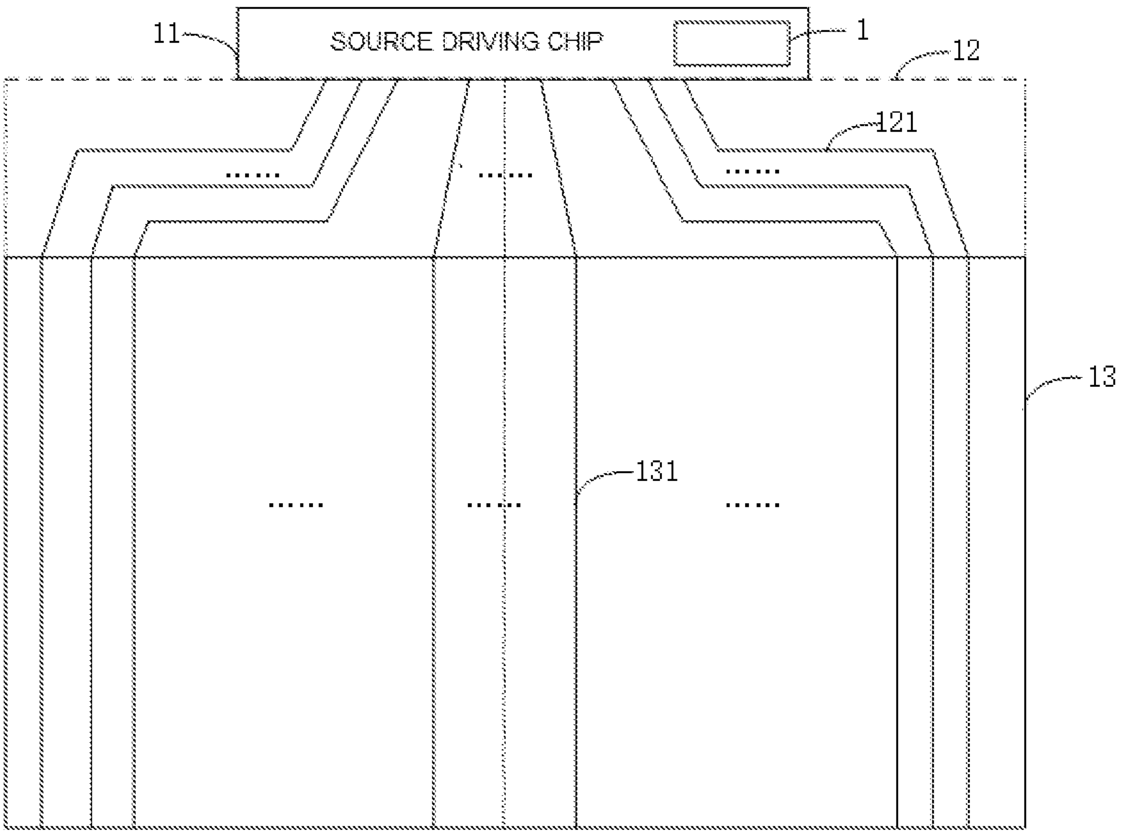
FIG. 1 is a schematic structural diagram of a display device according to an embodiment of the present disclosure.

As shown in FIG. 1, fan-out wires 121 are output wires for connecting solder pins of a source driving chip 11 to data lines 131 of a display area 13 of the display device to form an output channel. An area in which the fan-out wires 121 are located is referred to as a fan-out area 12 (a dashed frame between the source driving chip 11 and the display device in FIG. 1). Since the solder pins of the source driving chip 11 are closely arranged and the data lines 131 are distributed, distances between the solder pins and the data lines 131 are different, so that lengths of the fan-out wires 121 are different. It can be seen that in each fan-out wire 121 led out of the source driving chip 11, a length closer to the middle is shorter, and a length closer to both sides is longer. According to a calculation formula of resistance and capacitance C=ρl/S, it can be understood that the smaller the resistance-capacitance delay (RC delay) effect of the fan-out wire 121*s* led out closer to the middle is, the larger the resistance-capacitance delay effect of the fan-out wire 121*s* led out closer to both sides of the fan-out area 12 is. Therefore, at the same time, the longer the effective charging time of the data line 131 led out closer to the middle of the fan-out area 12 is, the shorter the effective charging time of the data line 131 led out closer to both sides of the fan-out area 12 is, so that the brighter the brightness of the pixels controlled by the data line 131 led out closer to the middle of the fan-out area 12 is, the lower the brightness of the pixels controlled by the data line 131 led out closer to both sides of the fan-out area 12 is. As a result, the display area 13 has an uneven display phenomenon which is bright in the middle and dark on both sides.

In response to the above-mentioned problem, as shown in FIG. 1, an embodiment of the present disclosure provides a signal delay adjustment device 1 of a display device, which is connected to a source driving chip 11 of the display device and is used to adjust a time at which the source driving chip 11 outputs data signals through a plurality of fan-out wires 121 of a fan-out area 12 of the display device.

That is, according varying lengths of the plurality of fan-out wires 121, RC delay effects vary, which leads to each fan-out wire not being able to reach a target voltage at the same time from an initial voltage, thereby causing a color deviation phenomenon. The signal delay adjustment device is provided in the display device, and the signal delay adjustment device adjusts the time at which each fan-out wire outputs a data signal, so that each fan-out wire can reach the target voltage at the same time from the initial voltage; that is, the data signal of the same potential is output at the same time.

It should be noted that the signal delay adjustment device 1 may be disposed inside the source driving chip 11 or may be disposed outside the source driving chip 11; for example, between an output end of the source driving chip 11 and an output end of the fan-out wires 121, or between an input end of the fan-out wires 121 and an output end. FIG. 1 shows a case where the signal delay adjustment device 1 is disposed inside the source driving chip 11.

Figure 2:
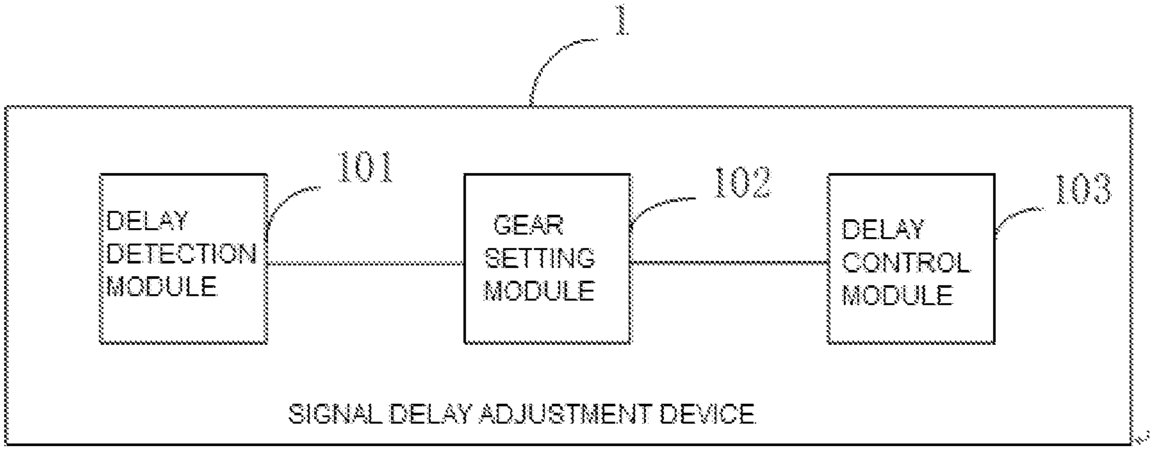
FIG. 2 is a schematic structural diagram of a signal delay adjustment device of the display device according to an embodiment of the present disclosure.

Further, as shown in FIG. 2, the signal delay adjustment device 1 comprises a delay detection module 101, a gear setting module 102, and a delay control module 103 connected in sequence, and the operation contents of the three modules are described in detail below.

The delay detection module 101 is configured to detect a fan-out delay duration of a fan-out wire 121 at the outermost of the fan-out area 12 and the fan-out delay duration of a fan-out wire 121 in the middle of the fan-out area 12 (dashed line in the middle of the fan-out area 12), and obtain a maximum fan-out compensation duration of the fan-out area 12 based on difference between the fan-out delay duration of fan-out wire at the outermost and the fan-out delay duration of the fan-out wire in the middle. Wherein, the fan-out delay duration is a time required for the fan-out wire to reach a target voltage from an initial voltage.

Specifically, it is known that a formula for the RC delay duration of the series connection between the resistance and the capacitance of the fan-out wires is as follows:

$$t = -RC\ln\left(\frac{V_0 - V}{V_0}\right)$$

Where t is the fan-out delay duration, R is a resistance value, C is a capacitance value, V0 is the initial voltage, and V is the target voltage.

According to the RC delay duration formula, for each fan-out wire, the length of the fan-out wire is first measured, the resistance value of each fan-out wire is calculated according to the length, and the fan-out delay duration of the fan-out wire can be calculated according to the resistance value, the capacitance value, and the target voltage.

Since the lengths of the fan-out wires 121 from the middle to the outer side of the fan-out area 12 become greater, the length of the fan-out wire in the middle is shortest based on the above-mentioned RC delay duration formula, so that the fan-out delay duration of the fan-out wire in the middle is minimum, and the fan-out delay duration of the fan-out wire at the outermost is longest, so that the fan-out delay duration of the fan-out wire at the outermost is maximum.

The time delay detection module 101 obtains the fan-out delay duration of the fan-out wire at the outermost and the fan-out delay duration of the fan-out wire in the middle and subtracts the fan-out delay duration of the fan-out wire in the middle from the fan-out delay duration of the fan-out wire at the outermost to obtain a time required for compensation of the fan-out wire at the outermost compared with the fan-out wire in the middle. The time required for compensation is the maximum fan-out compensation duration of the fan-out area.

The gear setting module 102 is configured to set and select a required fan-out adjustment gear according to the maximum fan-out compensation duration and the number of fan-out wires.

Specifically, the gear setting module 102 sets a plurality of fan-out adjustment gears according to the maximum fan-out compensation duration of the fan-out area and the number of fan-out wires determined by the delay detection module 101 and selects a required fan-out adjustment gear from the plurality of fan-out adjustment gears set according to the maximum fan-out compensation duration.

The delay control module 103 is configured to acquire a fan-out compensation duration required for each fan-out wire according to the gear adjustment duration corresponding to the required fan-out adjustment gear and delay the time of each fan-out wire output data signal according to the fan-out compensation duration of each fan-out wire, so that the fan-out delay durations of all fan-out wires are the same.

Specifically, the delay control module 103 obtains the gear adjustment duration corresponding to the required fan-out adjustment gear according to the required fan-out adjustment gear determined by the gear setting module 102, and obtains the fan-out compensation duration required for each fan-out wire according to the gear adjustment duration corresponding to the fan-out adjustment gear, wherein the fan-out compensation duration is the duration for compensating the fan-out delay duration of each fan-out wire; that is, the duration for delaying the time of each fan-out wire outputting a data signal, so that the time of each fan-out wire outputting a data signal is delayed by a corresponding fan-out compensation duration; therefore, the time of each fan-out wire reaching the target voltage from the initial voltage is the same, whereby at the same time, the voltage output from each fan-out wire is the same, and the brightness of pixels controlled by each fan-out wire is substantially the same. The uniformity of the display device is improved.

It should be noted that the fan-out area 12 of each source driving chip 11 comprises left and right symmetrical fan-out half areas (for example, left fan-out half are to the left of the dashed line in the middle of the fan-out area 12 in FIG. 1, and right fan-out half area to the right of the dashed line). Therefore, the compensation process of the signal delay adjustment device 1 in the two fan-out half areas are symmetrical to each other.

The signal delay adjustment device 1 according to an embodiment of the present disclosure detects a fan-out delay duration of each fan-out wire 121 by the delay detection module 101, obtains the maximum fan-out compensation duration of the fan-out area according to the difference between the fan-out delay duration of the fan-out wire 121 at the outermost of the fan-out are 12 and the fan-out delay duration of the fan-out wire in the middle of the fan-out are 12, then sets and selects the required fan-out adjustment gear according to the maximum fan-out compensation duration by the gear setting module 102, and finally obtains the fan-out compensation duration required for each fan-out wire according to the gear adjustment duration corresponding to the required fan-out adjustment gear by the delay control module 103, and delays the time at which each fan-out wire outputs a data signal according to the fan-out compensation duration required for each fan-out wire to compensate for the fan-out delay duration of each fan-out wire, thereby making fan-out delay durations of all fan-out wires the same. The signal delay adjustment device 1 enables the fan-out delay duration of all the fan-out wires 121 to be substantially the same, so that at the same time, the brightness of the pixel controlled by the fan-out wires 121 are substantially the same because the applied voltages are substantially the same, thereby improving the uniformity of the display device and preventing the occurrence of color deviation.

Further, the signal delay adjustment device not only compensates for the fan-out delay duration by adjustment of the times of the fan-out wire outputting signals due to the different lengths of the fan-out wires, but also takes into account the delay effect of the scan line transmission; that is, since the scan line causes start times of the pixels controlled by the fan-out wires to be different, before compensating for the fan-out delay duration, the times of the fan-out wire outputting signals are adjusted according to the different start times of the pixels controlled by the fan-out wires, so that the fan-out wires start to output data signals after the scan line turns on a corresponding row of pixels.

In one embodiment, the delay detection module 101 is further configured to detect the start time of the earliest opened pixel and the start time of the latest opened pixel in a row of pixels controlled by each scan line and obtain the maximum start compensation duration of the fan-out area based on the time difference between the start time of the latest opened pixel and the start time of the earliest opened pixel of the scan line.

Specifically, the start compensation duration refers to the time duration at which the fan-out wire output signal corresponding to each pixel needs to be delayed according to the time sequence in which the pixels are sequentially turned on by the scan line. The maximum start compensation refers to a time period in which the time of the output signal of the fan-out wire corresponding to the earliest opened pixel needs to be delayed compared to the time of the output signal of the fan-out wire corresponding to the latest opened pixel.

For example, if a row of pixels comprises 2n pixels, and a scan line turns on the first to the 2n pixels of a row controlled by the first to the 2n-th fan-out wires from left to right, the delay detection module 101 obtains the maximum start compensation duration of the fan-out area based on the time difference between the turn-on time of the 2n-th pixel and the turn-on time of the first pixel.

Further, the gear setting module 102 is further configured to set and select a required start adjustment gear according to the maximum start compensation duration and the number of fan-out wires.

Further, the delay control module 103 is further configured to acquire the start compensation duration of each fan-out wire according to the gear adjustment duration corresponding to the required start adjustment gear before compensating the fan-out delay duration of the fan-out wire, and delay the time at which each fan-out wire outputs the data signal according to the start compensation duration of each fan-out wire, so that after all the pixels controlled by all the fan-out wires are turned on by each scan line, all the fan-out wires start to output the data signals.

According to the signal delay adjustment device provided in the embodiment of the present disclosure, before compensating for the fan-out delay duration, all the corresponding pixels of each row according to each scan line are opened, the fan-out wires corresponding to the pixels of the row start to output data signals.

Specifically, the relationship between the maximum fan-out compensation duration and the fan-out adjustment gear is as follows:

$$T=n*ui*\text{gear}$$

Where t is the maximum fan-out compensation duration, n is the number of fan-out wires, ui is the unit fan-out delay duration, gear is the fan-out adjustment gear, and ui*gear is the gear adjustment duration corresponding to the fan-out adjustment gear.

Specifically, the relationship between the maximum start compensation duration and the start adjustment gear is:

$$t'=n*ui'*\text{gear}$$

Where t' is the maximum start compensation duration, n is the number of fan-out wires, ui' is the unit start delay duration, gear' is the start adjustment gear, and ui'*gear is the gear adjustment duration corresponding to the start adjustment gear.

Based on the above-described embodiment, the gear setting module 102 sets and selects the required fan-out adjustment gear according to the maximum fan-out compensation duration and the number of fan-out wires, and there are two setting procedures.

The first setting process is as follows:

The unit fan-out delay duration ui is set according to the data transmission period of the data signal.

According to the unit fan-out delay duration ui, a plurality of fan-out adjustment gears and a gear adjustment duration of each fan-out adjustment gear are set.

The maximum fan-out adjustment duration n*ui*gear corresponding to each of the fan-out adjustment gears gear is determined based on the gear adjustment duration ui*gear corresponding to each of the fan-out adjustment gears gear and the number n of the fan-out wires.

The fan-out adjustment gear gear corresponding to the maximum fan-out adjustment duration n*ui*gear, which is the same as the maximum fan-out compensation duration t, is selected as the required fan-out adjustment gear gear.

The gear setting module 102 according to the embodiment of the present disclosure first sets different fan-out adjustment gears gear according to the unit fan-out delay duration ui, acquires the gear adjustment duration ui*gear corresponding to each of the fan-out adjustment gears gear, then determines the maximum fan-out adjustment duration n*ui*gear corresponding to each of the fan-out adjustment gears gear according to the gear adjustment duration ui*gear corresponding to each of the fan-out adjustment gears gear and the number n of fan-out wires included in the fan-out area, and finally selects the fan-out adjustment gears gear corresponding to the maximum fan-out adjustment duration n*ui*gear that is same as the maximum fan-out compensation duration t as the required fan-out adjustment gear according to the maximum fan-out compensation duration t actually required by the fan-out area.

The second setting process is:

The unit start delay duration ui' is set according to the data transmission period of the data signal.

According to the unit start delay duration ui', a plurality of start adjustment gears gear' and a gear adjustment duration ui'*gear corresponding to each of the start adjustment gear gear' are set.

The maximum start adjustment duration n*ui'*gear corresponding to each of the start adjustment gears gear' is determined based on the gear adjustment duration ui'*gear corresponding to each of the start adjustment gears gear' and the number of the fan-out wires n.

The start adjustment gear gear' corresponding to the maximum start adjustment duration n*ui'*gear, which is the same as the maximum start compensation duration t', is selected as the required start adjustment gear gear'.

The gear setting module 102 according to the embodiment of the present disclosure first sets different start adjustment gears gear' according to the unit start delay duration ui', and acquires a gear adjustment duration ui'*gear corresponding to each start adjustment gear gear', and then determines a maximum start adjustment duration n*ui'*gear corresponding to each start adjustment gear gear' and the number n of fan-out wires included in the fan-out area, and finally selects the start adjustment gear gear' corresponding to the maximum start adjustment duration n*ui'*gear, which is same with the maximum start compensation duration t', to be the require start adjustment gear gear', according to the maximum start compensation duration t' actual required by the fan-out area.

It should be noted that the unit fan-out delay duration ui and the unit start delay duration ui' may be the same or different and may be set according to the fan-out delay compensation case and the start delay compensation case of the fan-out area respectively.

Figure 3:
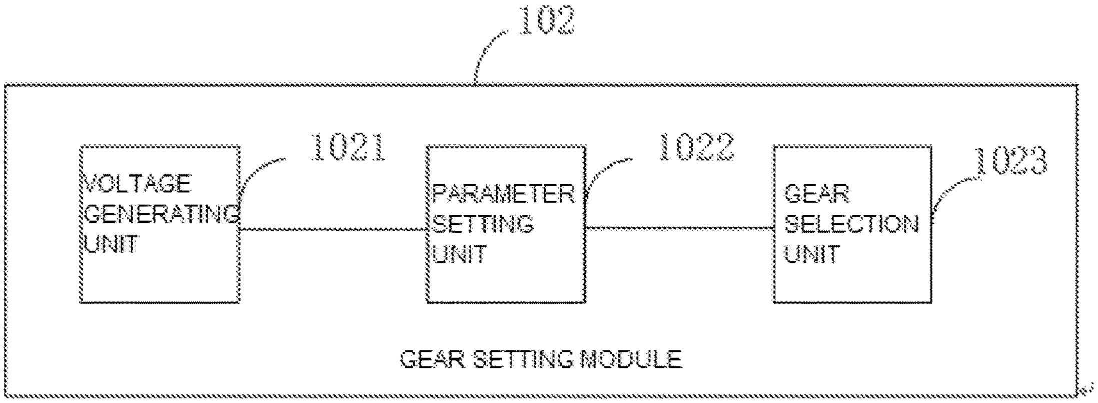
FIG. 3 is a schematic structural diagram of a gear setting module of the signal delay adjustment device according to an embodiment of the present disclosure.

Based on the above embodiment, as shown in FIG. 3, the gear setting module 102 comprises a parameter setting unit 1022 and a gear selecting unit 1023 connected to each other.

The parameter setting unit 1022 is configured to control a plurality of output pins out1, out2 . . . outk to output corresponding gear parameters by a plurality of pairs of independent parallel connected pull-up resistors R11 and pull-down resistors R12, respectively.

Figure 4:
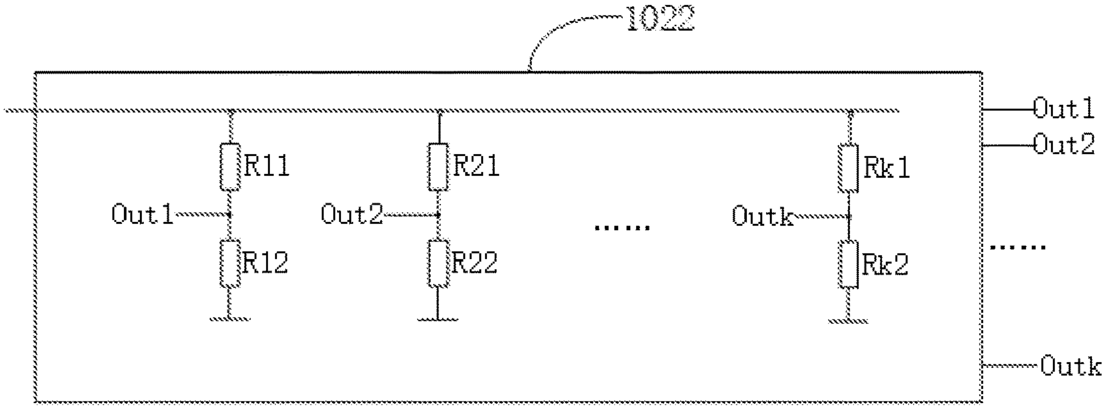
FIG. 4 is a schematic structural diagram of a parameter setting unit of the gear setting module according to an embodiment of the present disclosure.

Specifically, as shown in FIG. 4, assuming that k output pins are provided, the first pair of pull-up resistors R11 and pull-down resistors R12 connected in parallel control the first output pin out1, the second pair of pull-up resistors R21 and pull-down resistors R22 connected in parallel control the second output pin out2, and so on, the kth pair of pull-up resistors Rk1 and pull-down resistors Rk2 connected in parallel control the kth output pin outk.

When the pull-up resistor is powered up and the pull-down resistor is not powered up, the corresponding output pin outputs 1, and when the pull-up resistor is not powered up and the pull-down resistor is powered up, the corresponding output pin outputs 0, whereby the gear setting unit sequentially outputs gear parameters of 0 or 1 through the plurality of output pins out1, out2 . . . outk, respectively.

The gear selection unit 1023 is configured to perform a binary-to-decimal conversion operation according to a binary string composed of a plurality of gear parameters to acquire and select a required fan-out adjustment gear and a start adjustment gear.

Specifically, the gear selection unit 1023 performs conversion from binary to decimal according to 0 or 1 output from the plurality of output pins out1, out2 . . . outk of the parameter setting unit 1022, thereby obtaining the required fan-out adjustment gear and the start adjustment gear.

Based on the above embodiment, as shown in FIGS. 3 and 4, the gear setting module 102 further comprises a voltage generating unit 1021 for outputting a fixed voltage value.

Specifically, one end of the pull-up resistor in a pair and one end of the pull-down resistor in the same pair are respectively connected to corresponding output pins, the other end of the pull-up resistor is connected to an output end of the voltage generating unit, and the other end of the pull-down resistor is grounded.

Figure 5:
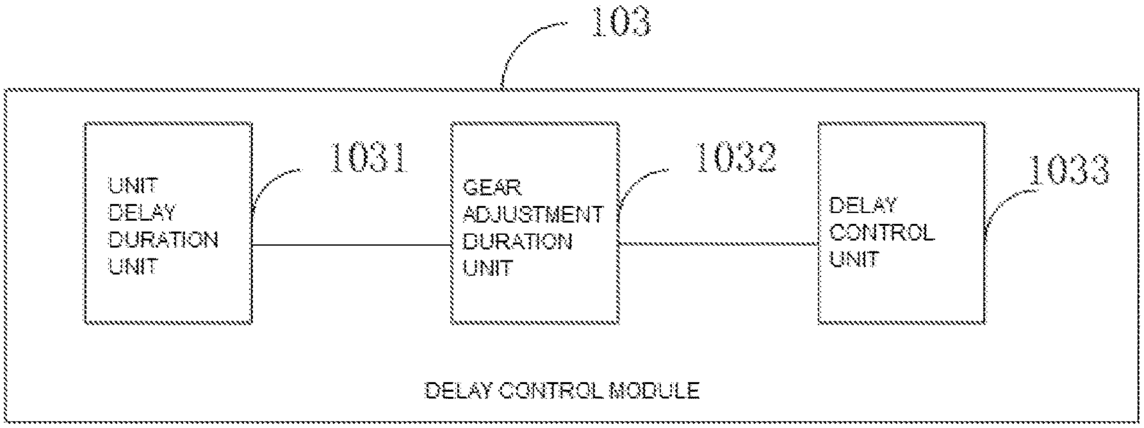
FIG. 5 is a schematic structural diagram of a delay control module of the signal delay adjustment device according to an embodiment of the present disclosure.

Based on the above embodiment, as shown in FIG. 5, the delay control module 103 comprises a unit delay duration unit 1031, a gear adjustment duration unit 1032, and a delay control unit 1033 connected in sequence.

The unit delay duration unit 1031 is configured to set the unit fan-out delay duration and the unit start delay duration.

The gear adjustment duration unit 1032 is configured to acquire the gear adjustment duration corresponding to the fan-out adjustment gear according to the unit fan-out delay duration and the fan-out adjustment gear, and to acquire the gear adjustment duration corresponding to the start adjustment gear according to the unit start delay duration and the start adjustment gear.

The delay control unit 1033 is configured to first acquire the start compensation duration of each fan-out wire according to the gear adjustment duration corresponding to the start adjustment gear, delay the time at which each fan-out wire outputs data signals according to the start compensation duration of each fan-out wire, and then acquire the fan-out compensation duration of each fan-out wire according to the gear adjustment duration corresponding to the fan-out adjustment gear, and delay the time at which each fan-out wire outputs data signals according to the fan-out compensation duration of each fan-out wire.

According to the above-described embodiment, if the fan-out area comprises 2i fan-out wires, each scan line turns on from left to right a row of pixels controlled by the 2i fan-out wires, and the time delay control unit 1033 delays the time of outputting a data signal by each fan-out wire according to the start compensation duration of each fan-out wire, specifically comprising:

Delaying the second fan-out wire of the outermost part of the fan-out area by one gear adjustment duration corresponding to the start adjustment gear to output the data signals.

Delaying the third fan-out wire on the outermost side of the fan-out area by a gear adjustment duration corresponding to two start adjustment gears to output the data signals.

Similarly, the left-most 2i-th fan-out wire of the fan-out area is delayed by a gear adjustment duration corresponding to 2i−1 start adjustment gears to output the data signals.

Based on the above-described embodiment, if the fan-out area comprises 2i fan-out wires, the time delay control unit 1033 delays the time at which each fan-out wire outputs the data signal according to the fan-out compensation duration of each fan-out wire, specifically comprising:

Delaying the second fan-out wire of the outermost part of both sides of the fan-out area by one gear adjustment duration corresponding to the start adjustment gear to output the data signals.

Delaying the third fan-out wire on the outermost side of both sides of the fan-out area by a gear adjustment duration corresponding to two start adjustment gears to output the data signals.

Similarly, the i-th fan-out wire in the middle of the fan-out area is delayed by a gear adjustment duration corresponding to i−1 start adjustment gears to output the data signals.

Figure 7:
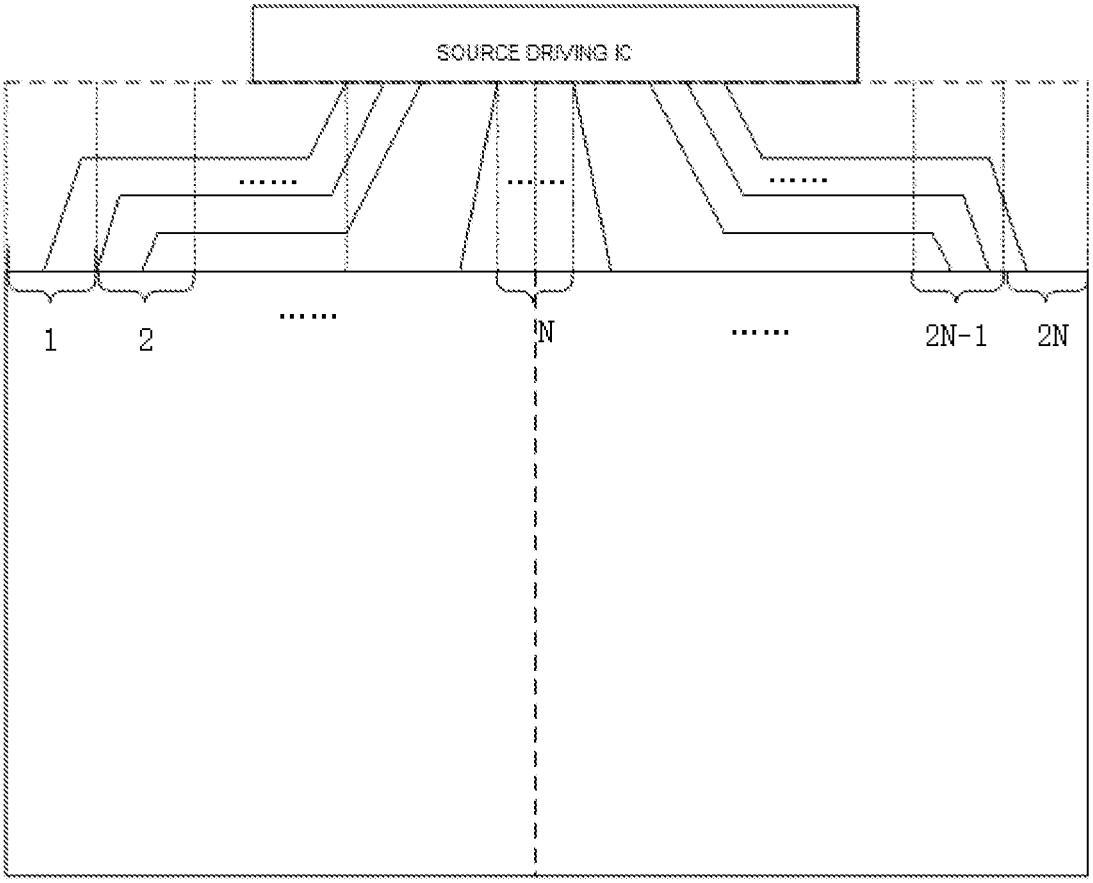
FIG. 7 is a schematic diagram of segmentation of a fan-out area according to an embodiment of the present disclosure.

It is to be understood that FIG. 7 is a schematic diagram of segmentation of a fan-out area according to an embodiment of the present disclosure. As shown in FIG. 7, since the resolution of a human eye is limited, an area in which every m fan-out wires are located may be divided into one fan-out sub-area, and the fan-out area may be divided into 2N fan-out sub-areas from left to right. The Nth fan-out sub-area is a fan-out sub-area in the middle, and the first fan-out sub-area and the 2N fan-out sub-area are outermost fan-out sub-areas. Therefore, it is only necessary to compensate each fan-out sub-area as one unit. The detailed operation of the signal delay adjustment device will be described in accordance with the division rule.

It should be noted that the start delay duration of each fan-out sub-area is an average time of the start time of the pixels at which the scan line turns on the pixels controlled by the m fan-out wires. In addition, compensating the start delay duration of each fan-out sub-area is to delay the time at which the m fan-out wires output data signals in each fan-out sub-area according to a uniform fan-out compensation duration, that is, the time at which the m fan-out wires output data signals is simultaneously delayed by the corresponding start compensation duration.

It should be further noted that the fan-out delay duration of each fan-out sub-area is an average value of the fan-out delay duration of the m fan-out wires in each fan-out sub-area. In addition, compensating the fan-out delay duration of each fan-out sub-area is to delay the time at which the m fan-out wires output data signals in each fan-out sub-area according to a uniform fan-out compensation duration, that is, the time at which the m fan-out wires output data signals is simultaneously delayed by the corresponding fan-out compensation duration.

Figure 6:
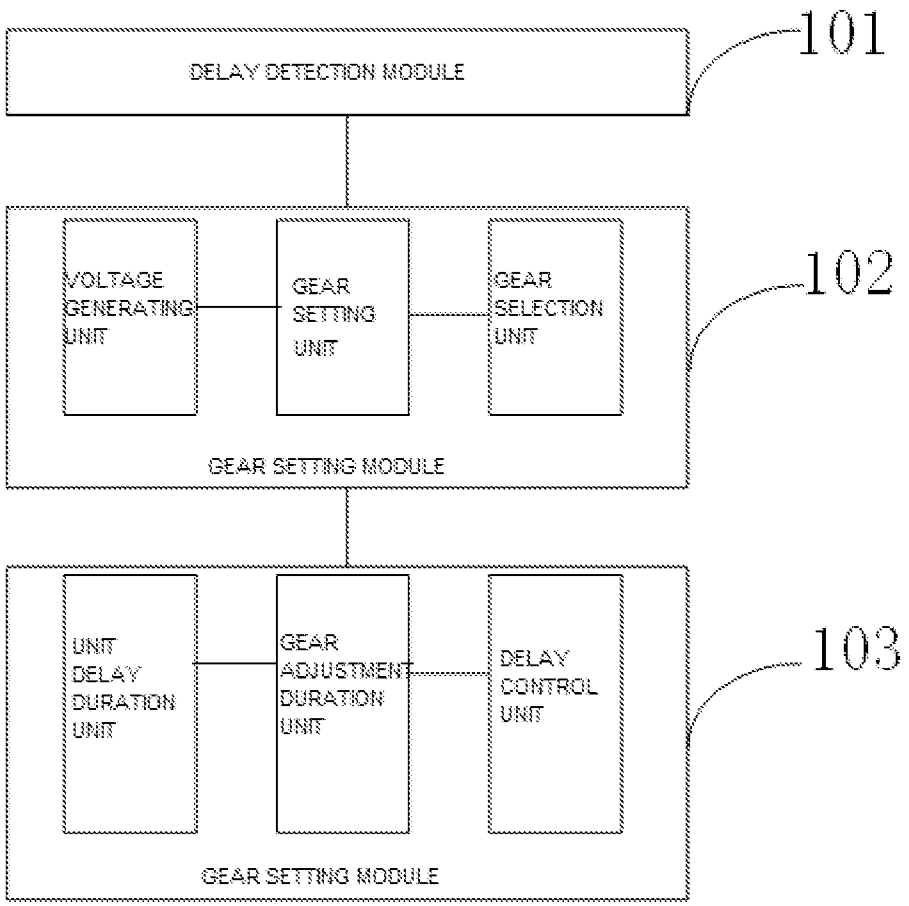
FIG. 6 is a schematic structural diagram of another signal delay adjustment device according to an embodiment of the present disclosure.

In one embodiment, FIG. 6 is a schematic diagram of another configuration of a signal delay adjustment device according to an embodiment of the present disclosure. As shown in FIG. 6, a specific operation of the signal delay adjustment device is as follows:

S1. assuming that the scan line turns on the first fan-out sub-area to the 2N fan-out sub-area from left to right, the maximum start compensation duration of the fan-out area is acquired through the delay detection module 101 based on the difference between the average value of the start time of the pixel controlled by the m fan-out wires in the 2N fan-out sub-area and the average value of the start time of the pixel controlled by the m fan-out wires in the first fan-out sub-area.

Meanwhile, the fan-out delay duration of the fan-out sub-area at the outermost is acquired through the delay detection module 101 based on the average value of the fan-out delay duration of the m fan-out wires in the first fan-out sub-area or the 2N fan-out sub-area, and the fan-out delay duration of the fan-out sub-area in the middle is acquired based on the average value of the fan-out delay duration of the m fan-out wires in the Nth fan-out sub-area, and the maximum fan-out compensation duration of the fan-out area is acquired by subtracting the fan-out delay duration of the fan-out sub-area in the middle from the fan-out delay duration of the fan-out sub-area at the outermost.

S2, a plurality of gear parameters are output through the output pins of the parameter setting unit 1022 of the gear setting module 102, and then the plurality of gear parameters are converted from binary to decimal through the gear selection unit 1023, so that a start adjustment gear meeting the maximum start compensation duration and a fan-out adjustment gear meeting the maximum fan-out compensation duration are selected.

S3. a unit start delay duration and a unit fan-out delay duration are set by the unit delay duration unit 1031 of the delay control module 103, the gear adjustment duration corresponding to the start adjustment gear is acquired by the gear adjustment duration unit 1032 according to the unit start delay duration and a selected start adjustment gear, a gear adjustment duration corresponding to the fan-out adjustment gear is acquired according to the unit fan-out delay duration and the selected fan-out adjustment gear, and finally the start compensation duration of each fan-out wire is acquired according to the gear adjustment duration corresponding to the start adjustment gear by the delay control unit 1033, and a time at which each fan-out wire outputs a data signal is delayed according to the start compensation duration of each fan-out wire, and then a fan-out compensation duration of each fan-out wire is acquired according to the gear adjustment duration corresponding to the fan-out adjustment gear, and the time at which each fan-out wire outputs a data signal is delayed, according to the fan-out compensation duration of each fan-out wire.

In one embodiment, when the resolution of the display device is 1920*1080, the fan-out area leads out 1920 output channels (i.e., 1920 data lines, the output channels are denoted by ch below) through 1920 fan-out wires. Assuming that the display device employs two source driving chips, a first source driving chip is configured to control ch1-ch960 and a second source driving chip is configured to control ch961-ch1920. The 960 ches extracted from the fan-out area of each source driving chip comprises left and right symmetrical fan-out half areas, and each fan-out half area comprises 480 ches.

Taking the ch1-h960 controlled by the first source driving chip as an example, assuming that each fan-out half area is divided into 40 fan-out sub-areas, each fan-out sub-area comprises 12 fan-out wires, that is, each fan-out sub-area leads out 12 ch.

Table 1 is a table of compensation parameters for the fan-out delay compensation of the signal delay adjustment device of the display device. Seven fan-out adjustment gears (5)-(11) are provided in Table 1, where ui denotes the unit fan-out delay duration, H denotes the high potential, and L denotes the low potential.

Figure 8:
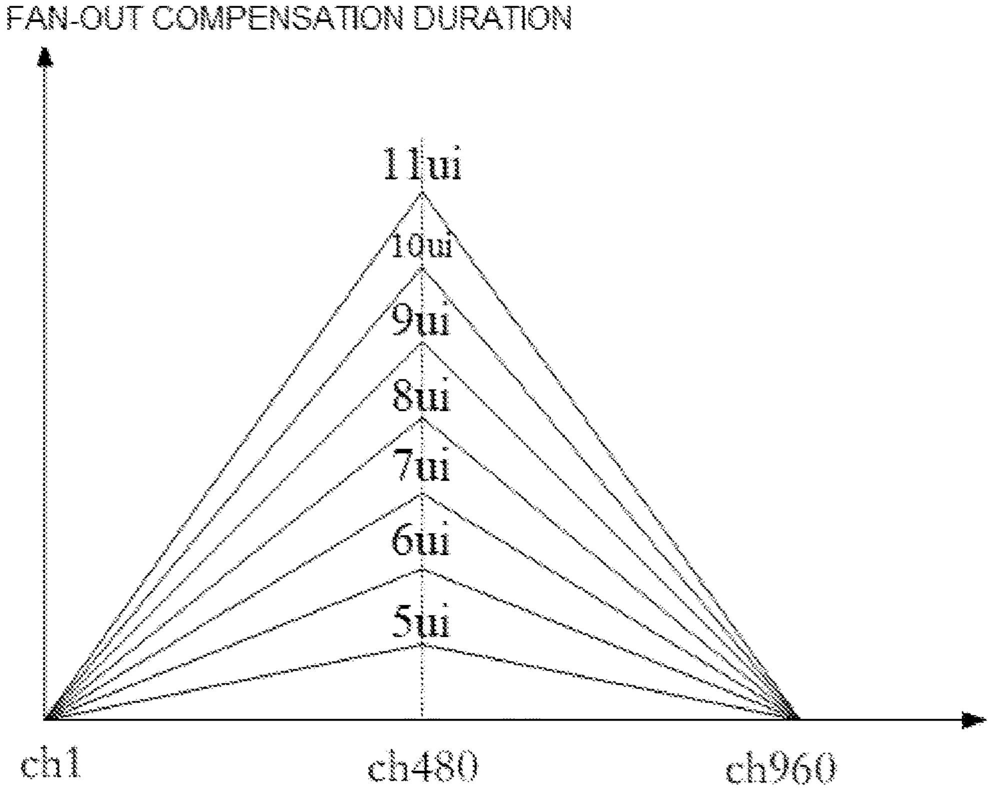
FIG. 8 is a time delay diagram of fan-out delay compensation according to an embodiment of the present disclosure.

FIG. 8 is a time delay diagram of fan-out delay compensation according to an embodiment of the present disclosure, and FIG. 8 is a diagram showing a fan-out delay compensation duration of an example of the ch1-ch960 controlled by the first source driving chip of the display device. Referring to Table 1 and FIG. 8, if the gear selection unit 1023 needs to output seven fan-out adjustment gears, the parameter setting unit 1022 needs at least three output pins, and the potential set by the three output pins may be HHH, HHL, HLH, LHH, HHL, LHL, LLH, and LLL, so that the output gears (5) to (11) have seven fan-out adjustment gears. It can be understood that the three output pins provide at most eight adjustment gears, and the actual gear value of each adjustment gear can be set on its own. When the adjustment gear (5) is selected, the potential of the three output pins for fan-out gear adjustment in the parameter setting unit 1022 is set to LLH. The three output pins are set to the first output pin out1, the second output pin out2, and the third output pin out3, respectively. Then, the pull-down resistor R12 of the first output pin out1 and the pull-down resistor R22 of the second output pin out2 are powered up and the pull-up resistor R11 of the first output pin out1 and the pull-up resistor R21 of the second output pin out2 are powered down, and the pull-up resistor R31 of the third output pin out3 is powered up and the pull-down resistor R32 of the third output pin out3 is powered down, so that the gear selection unit 1023 selects the fan-out adjustment gear (5) according to the potential LLH of the three output pins.

Table 2 is a table of compensation parameters of the signal delay adjustment device for the start delay compensation of the above-mentioned exemplary display device. In Table 2, three fan-out adjustment gears (1) to (3) are provided, where ui' denotes the unit start delay duration, H denotes the high potential, and L denotes the low potential.

TABLE 2

| Compensation parameter | Start delay compensation | | | |
|---|---|---|---|---|
| Start adjustment gear | 0 | (1) | (2) | (3) |
| Start gear adjustment duration | 0 | Ui' | 2 ui' | 3 ui' |
| Maximum start delay duration | 0 | 40 ui' | 80 ui' | 120 ui' |
| Output pin (potential) | LL | LH | HL | HH |

It should be noted that the compensation parameters of the fan-out adjustment gear of Table 1 and the compensation parameters of the start adjustment gear of Table 2 are merely examples, and more fan-out adjustment gears and start adjustment gears may be provided.

It should also be noted that if the data transmission rate Data rata of the fan-out wire is 300 MHz, the data transmission period t is 1/300 MHz; that is, 3.33 ns, and the unit fan-out delay duration ui=gt, wherein g can be set to a value less than 1 or not less than 1 according to the actual required gear adjustment precision, (the smaller g is, the higher gear adjustment precision is, and the larger g is, the lower gear

TABLE 1

| Compensation parameter | Fan-out delay compensation | | | | | | | |
|---|---|---|---|---|---|---|---|---|
| Fan-out adjustment gear | 0 | (5) | (6) | (7) | (8) | (9) | (10) | (11) |
| Fan-out gear adjustment duration | 0 | 5 ui | 6 ui | 7 ui | 8 ui | 9 ui | 10 ui | 11 ui |
| Maximum fan-out delay duration | 0 | 200 ui | 240 ui | 280 ui | 320 ui | 360 ui | 400 ui | 440 ui |
| Output pin (potential) | LLL | LLH | LHL | LHH | HLL | HLH | HHL | HHH |

adjustment precision). Assuming that g is 0.5, ui=0.5t=1.667 ns, the gear adjustment duration corresponding to the adjustment gear (5) is 5*1.667 ns=8.325 ns, and the gear adjustment duration corresponding to the gear (6) is 6*1.667 ns=10.002 ns, and so on. The gear adjustment duration corresponding to the gear (11) is 11*1.667 ns=18.337 ns.

Figure 9:
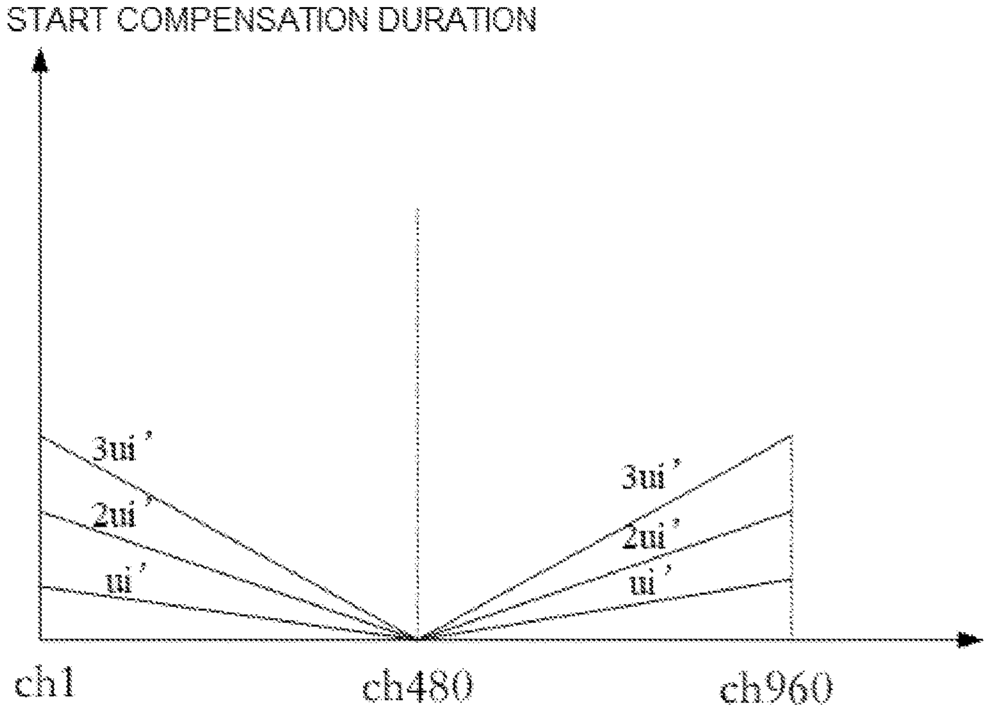
FIG. 9 is a time delay diagram of start delay compensation according to an embodiment of the present disclosure.

FIG. 9 is a time delay diagram of a start delay compensation according to an embodiment of the present disclosure, and FIG. 9 shows a start delay compensation duration of the ch1-ch960 controlled by the first source driving chip of the above exemplary display device. Referring to Table 2 and FIG. 9, if the gear selection unit 1023 needs to output three start adjustment gears, the parameter setting unit 1022 needs at least two output pins, and the potential set by the two output pins may be four types of LL, LH, HL, and HH, so that three start adjustment gears (1) to (3) can be output. It can be understood that the two output pins provide at most four adjustment gears, and the actual gear value of each adjustment gear may be set on its own. When the adjustment gear (2) is selected, the potential of the two output pins for adjustment the start gear in the parameter setting unit 1022 is set to HL. The two output pins are set to the fourth output pin out4 and the fifth output pin out5, respectively. Then, the pull-up resistor R41 of the fourth output pin out4 is powered up and the pull-down resistor R42 of the fourth output pin out4 is powered down, and the pull-down resistor R52 of the fifth output pin out5 is powered up and the pull-up resistor R51 of the fifth output pin out5 is powered down, so that the gear selection unit 1023 selects the start adjustment gear (2) according to the potential HL of the two output pins.

The setting process of the unit start delay duration is similar to that of the unit fan-out delay duration, and details are not described herein.

It can be understood that the larger the number of fan-out sub-areas divided by the fan-out area, that is, the larger the n, the smaller the number of fan-out wires included in each fan-out sub-area, that is, the smaller the m, the higher the adjustment accuracy of the display device as a whole. On the contrary, if the smaller the n, the larger the m, the lower the adjustment accuracy of the display device as a whole.

Further, for the fan-out area in which the fan-out sub-areas have been divided, whether the fan-out delay compensation or the start delay compensation is performed, it is possible to set the gear adjustment duration corresponding to the different adjustment gears according to the different adjustment gears and the unit delay duration, wherein the larger the adjustment gears, the larger the delay degree representing the adjustment, and the smaller the adjustment gears, the smaller the delay degree representing the adjustment. The shorter the unit delay duration is, the higher the adjustment precision is. The longer the unit delay duration is, the lower the adjustment precision is.

Finally, it should be emphasized that in the driving chip of the display device, since the gate driving chip can already converge to the gate on array (GOA) circuit, the gate driving chip has no additional cost, and therefore the cost of the source driving chip is much higher than that of the gate driving chip. The dual-gate transistor architecture or the three-dimensional transistor architecture can minimize the number of source driving chips, thereby greatly reducing the manufacturing cost of the display device. By applying the signal delay adjustment device provided in the embodiment of the present disclosure to the source driving chip of the display device of the double-gate transistor structure or the three-dimensional transistor structure, the serious color deviation phenomenon caused by the sharp increase of the area of the control area of each source driving chip can be effectively reduced, that is, the signal delay adjustment device is particularly suitable for the display device of the double-gate transistor structure or the three-dimensional transistor structure, and the display uniformity of the display device of the double-gate transistor structure or the three-dimensional transistor structure can be greatly improved.

According to the signal delay adjustment device provided in the embodiment of the present disclosure, not only the delay effect of the fan-out area is considered, but also the delay effect of the scan line transmission is considered. Meanwhile, a corresponding compensation process is provided for the delay effect of the fan-out area and the delay effect of the scan line transmission, respectively. In addition, the signal delay adjustment device provided in the embodiment of the present disclosure sets the electric potential of the output pin by using the pull-up resistor and the pull-down resistor, so as to output the corresponding adjustment gear through the output pins. Therefore, the adjustment gear is set in a hardware adjustment manner, and software compensation by using the timing controller having the adjustment function is not required, thereby greatly increasing the flexibility of using the signal delay adjustment device.

It can be understood by those of ordinary skill in the art that equivalents may be substituted or altered in accordance with the technical solution of the present disclosure and its inventive concept, and all such variations or substitutions are intended to fall within the scope of the claims appended hereto.

What is claimed is:

1. A signal delay adjustment device of a display device, wherein the signal delay adjustment device is connected to a source driving chip of the display device and is configured to adjust a time at which the source driving chip outputs data signals through a plurality of fan-out wires in a fan-out area of the display device, respectively;

the signal delay adjustment device comprises a delay detection module, a gear setting module, and a delay control module sequentially connected;

the delay detection module is configured to detect a fan-out delay duration of the fan-out wire at the outermost of the fan-out area and a fan-out delay duration of the fan-out wire in middle of the fan-out area, and acquire a maximum fan-out compensation duration of the fan-out area according to a difference between the fan-out delay duration of the fan-out wire at the outermost and the fan-out delay duration of the fan-out wire in the middle of the fan-out area; wherein the fan-out delay duration is a duration required for the fan-out wires to reach a target voltage from an initial voltage;

the delay detection module is further configured to detect a start time of a pixel turned on earliest and a start time of a pixel turned on latest in a row of pixels controlled by each scan line, and acquire a maximum start compensation duration of the fan-out area based on a time difference between the start time of the pixel turned on latest and the start time of the pixel turned on earliest of the scan line;

the gear setting module is configured to set and select a required fan-out adjustment gear according to the maximum fan-out compensation duration and a number of fan-out wires;

the gear setting module is further configured to set and select a required start adjustment gear according to the maximum start compensation duration and the number of fan-out wires;

the delay control module is configured to acquire a fan-out compensation duration required by each fan-out wire according to a required gear adjustment duration corresponding to the fan-out adjustment gear, and delay a time at which each fan-out wire outputs a data signal according to the fan-out compensation duration of each fan-out wire, so that the fan-out delay durations of all fan-out wires are same;

the delay control module is further configured to obtain a start compensation duration of each fan-out wire according to a gear adjustment duration corresponding to the start adjustment gear before compensating the fan-out delay duration of the fan-out wire, and delay a time at which each fan-out wire outputs a data signal according to the start compensation duration of each fan-out wire, so that after all pixels controlled by all fan-out wires are turned on by each scan line, all fan-out wires start to output data signals;

the gear setting module comprises a parameter setting unit and a gear selecting unit connected to each other;

the parameter setting unit is configured to control gear parameters corresponding to an output of a plurality of output pins through a plurality of pairs of independent pull-up resistors and pull-down resistors connected in parallel; and the gear selection unit is configured to perform a binary conversion to decimal calculation operation based on a plurality of the gear parameters to acquire and select the fan-out adjustment gear and the start adjustment gear.

2. The signal delay adjustment device according to claim 1, wherein a relationship between the maximum fan-out compensation duration and the fan-out adjustment gear is as follows:

$$t=n*ui*\text{gear}$$

wherein t is the maximum fan-out compensation duration, n is the number of fan-out wires, ui is a unit fan-out delay duration, gear is a fan-out adjustment gear, and ui*gear is the gear adjustment duration corresponding to the fan-out adjustment gear;

a relationship between the maximum start compensation duration and the start adjustment gear is as follows:

$$t'=n*ui'*\text{gear}'$$

wherein t' is the maximum start compensation duration, n is the number of fan-out wires, ui' is a unit start delay duration, gear' is the start adjustment gear, and ui'*gear' is the gear adjustment duration corresponding to the start adjustment gear.

3. The signal delay adjustment device according to claim 2, wherein the gear setting module sets and selects the fan-out adjustment gear according to the maximum fan-out compensation duration and the number of fan-out wires, comprising:

setting the unit fan-out delay duration according to a data transmission period of the data signal;

setting a plurality of the fan-out adjustment gears and the gear adjustment duration of each of the fan-out adjustment gears according to the unit fan-out delay duration;

determining a maximum fan-out adjustment duration corresponding to each fan-out adjustment gear according to the gear adjustment duration corresponding to each fan-out adjustment gear and the number of fan-out wires; and selecting the fan-out adjustment gear corresponding to the maximum fan-out adjustment duration that is same as the maximum fan-out compensation duration as the fan-out adjustment gear required.

4. The signal delay adjustment device according to claim 2, wherein the gear setting module sets and selects the start adjustment gear required according to the maximum start compensation duration and the number of fan-out wires, specifically comprising:

setting the unit start delay duration according to a data transmission period of the data signal;

setting a plurality of the start adjustment gears and the gear adjustment duration corresponding to each start adjustment gear according to the unit start delay duration;

determining a maximum start adjustment duration corresponding to each start adjustment gear based on the gear adjustment duration corresponding to each start adjustment gear and the number of fan-out wires; and selecting the start adjustment gear corresponding to the maximum start adjustment duration that is same as the maximum start compensation duration as the start adjustment gear required.

5. The signal delay adjustment device according to claim 1, wherein the gear setting module further comprises a voltage generating unit for outputting a fixed voltage; and one end of the pull-up resistor and one end of the pull-down resistor in each pair of the pull-up resistor and the pull-down resistor are respectively connected to corresponding output pins, the other end of the pull-up resistor is connected to an output end of the voltage generating unit, and the other end of the pull-down resistor is grounded.

6. The signal delay adjustment device according to claim 1, wherein the delay control module comprises a unit delay duration unit, a gear adjustment duration unit, and a delay control unit connected in sequence;

the unit delay duration unit is configured to set a unit fan-out delay duration and a unit start delay duration;

the gear adjustment duration unit is configured to acquire a gear adjustment duration corresponding to the fan-out adjustment gear according to the unit fan-out delay duration and the fan-out adjustment gear, and to acquire a gear adjustment duration corresponding to the start adjustment gear according to the unit start delay duration and the start adjustment gear; and the delay control unit is configured to acquire the start compensation duration of each fan-out wire according to the gear adjustment duration corresponding to the start adjustment gear, delay a time at which each fan-out wire outputs the data signal according to the start compensation duration of each fan-out wire, and acquire the fan-out compensation duration of each fan-out wire according to the gear adjustment duration corresponding to the fan-out adjustment gear, and delay the time at which each fan-out wire outputs the data signal according to the fan-out compensation duration of each fan-out wire.

7. A display device, comprising a delay signal adjustment device, wherein the signal delay adjustment device is connected to a source driving chip of the display device and is configured to adjust a time at which the source driving chip outputs data signals through a plurality of fan-out wires in a fan-out area of the display device, respectively; the signal delay adjustment device comprises a delay detection module, a gear setting module, and a delay control module sequentially connected;

the delay detection module is configured to detect a fan-out delay duration of the fan-out wire at the outermost of the fan-out area and a fan-out delay duration of the fan-out wire in the middle of the fan-out area, and acquire a maximum fan-out compensation duration of the fan-out area according to a difference between the fan-out delay duration of the fan-out wire at the outermost and the fan-out delay duration of the fan-out wire in the middle of the fan-out area; wherein the fan-out delay duration is a duration required for the fan-out wire to reach a target voltage from an initial voltage;

the delay detection module is further configured to detect a start time of a pixel turned on earliest and a start time of a pixel turned on latest in a row of pixels controlled by each scan line, and acquire a maximum start compensation duration of the fan-out area based on a time difference between the start time of the pixel turned on latest and the start time of the pixel turned on earliest of the scan line;

the gear setting module is configured to set and select a fan-out adjustment gear according to the maximum fan-out compensation duration and a number of fan-out wires;

the gear setting module is further configured to set and select a required start adjustment gear according to the maximum start compensation duration and the number of fan-out wires;

the delay control module is configured to acquire a fan-out compensation duration required by each fan-out wire according to a gear adjustment duration required corresponding to the fan-out adjustment gear and delay a time at which each fan-out wire outputs a data signal according to the fan-out compensation duration of each fan-out wire, so that the fan-out delay durations of all fan-out wires are same;

the delay control module is further configured to obtain a start compensation duration of each fan-out wire according to a gear adjustment duration corresponding to the start adjustment gear before compensating the fan-out delay duration of the fan-out wire, and delay a time at which each fan-out wire outputs a data signal according to the start compensation duration of each fan-out wire, so that after all pixels controlled by all fan-out wires are turned on by each scan line, all fan-out wires start to output data signals;

the gear setting module comprises a parameter setting unit and a gear selecting unit connected to each other;

the parameter setting unit is configured to control gear parameters corresponding to an output of a plurality of output pins through a plurality of pairs of independent pull-up resistors and pull-down resistors connected in parallel; and the gear selection unit is configured to perform a binary conversion to decimal calculation operation based on a plurality of the gear parameters to acquire and select the fan-out adjustment gear and the start adjustment gear.

8. The display device according to claim 7, wherein a relationship between the maximum fan-out compensation duration and the fan-out adjustment gear is as follows:

$$t=n*ui*\text{gear}$$

wherein t is the maximum fan-out compensation duration, n is the number of fan-out wires, ui is a unit fan-out delay duration, gear is a fan-out adjustment gear, and ui*gear is the gear adjustment duration corresponding to the fan-out adjustment gear;

a relationship between the maximum start compensation duration and the start adjustment gear is as follows:

$$t'=n*ui'*\text{gear}'$$

wherein t' is the maximum start compensation duration, n is the number of fan-out wires, ui' is a unit start delay duration, gear' is the start adjustment gear, and ui'*gear' is the gear adjustment duration corresponding to the start adjustment gear.

9. The display device according to claim 8, wherein the gear setting module sets and selects the fan-out adjustment gear according to the maximum fan-out compensation duration and the number of fan-out wires, comprising:

setting the unit fan-out delay duration according to a data transmission period of the data signal;

setting a plurality of the fan-out adjustment gears and the gear adjustment duration of each of the fan-out adjustment gears according to the unit fan-out delay duration;

determining a maximum fan-out adjustment duration corresponding to each fan-out adjustment gear according to the gear adjustment duration corresponding to each fan-out adjustment gear and the number of fan-out wires; and selecting the fan-out adjustment gear corresponding to the maximum fan-out adjustment duration that is same as the maximum fan-out compensation duration as the fan-out adjustment gear required.

10. The display device according to claim 8, wherein the gear setting module sets and selects the start adjustment gear required according to the maximum start compensation duration and the number of fan-out wires, specifically comprising:

setting the unit start delay duration according to a data transmission period of the data signal;

setting a plurality of the start adjustment gears and the gear adjustment duration corresponding to each start adjustment gear according to the unit start delay duration;

determining a maximum start adjustment duration corresponding to each start adjustment gear based on the gear adjustment duration corresponding to each start adjustment gear and the number of fan-out wires; and selecting the start adjustment gear corresponding to the maximum start adjustment duration that is same as the maximum start compensation duration as the start adjustment gear required.

11. The display device according to claim 7, wherein the gear setting module further comprises a voltage generating unit for outputting a fixed voltage; and one end of the pull-up resistor and one end of the pull-down resistor in each pair of the pull-up resistor and the pull-down resistor are respectively connected to corresponding output pins, the other end of the pull-up resistor is connected to an output end of the voltage generating unit, and the other end of the pull-down resistor is grounded.

12. The display device according to claim 7, wherein the delay control module comprises a unit delay duration unit, a gear adjustment duration unit, and a delay control unit connected in sequence;

the unit delay duration unit is configured to set a unit fan-out delay duration and a unit start delay duration;

the gear adjustment duration unit is configured to acquire a gear adjustment duration corresponding to the fan-out adjustment gear according to the unit fan-out delay duration and the fan-out adjustment gear, and to acquire a gear adjustment duration corresponding to the start adjustment gear according to the unit start delay duration and the start adjustment gear; and the delay control unit is configured to acquire the start compensation duration of each fan-out wire according to the gear adjustment duration corresponding to the start adjustment gear, delay a time at which each fan-out wire outputs the data signal according to the start compensation duration of each fan-out wire, and acquire the fan-out compensation duration of each fan-out wire according to the gear adjustment duration corresponding to the fan-out adjustment gear, and delay the time at which each fan-out wire outputs the data signal according to the fan-out compensation duration of each fan-out wire.

13. A signal delay adjustment device of a display device, wherein the signal delay adjustment device is connected to a source driving chip of the display device and is configured to adjust a time at which the source driving chip outputs data signals through a plurality of fan-out wires in a fan-out area of the display device, respectively;

the signal delay adjustment device comprises a delay detection module, a gear setting module, and a delay control module sequentially connected;

the delay detection module is configured to detect a fan-out delay duration of the fan-out wire at the outermost of the fan-out area and a fan-out delay duration of the fan-out wire in middle of the fan-out area, and acquire a maximum fan-out compensation duration of the fan-out area according to a difference between the fan-out delay duration of the fan-out wire at the outermost and the fan-out delay duration of the fan-out wire in the middle of the fan-out area; wherein the fan-out delay duration is a duration required for the fan-out wires to reach a target voltage from an initial voltage;

the delay detection module is further configured to detect a start time of a pixel turned on earliest and a start time of a pixel turned on latest in a row of pixels controlled by each scan line, and acquire a maximum start compensation duration of the fan-out area based on a time difference between the start time of the pixel turned on latest and the start time of the pixel turned on earliest of the scan line;

the gear setting module is configured to set and select a required fan-out adjustment gear according to the maximum fan-out compensation duration and a number of fan-out wires;

the gear setting module is further configured to set and select a required start adjustment gear according to the maximum start compensation duration and the number of fan-out wires;

the delay control module is configured to acquire a fan-out compensation duration required by each fan-out wire according to a required gear adjustment duration corresponding to the fan-out adjustment gear, and delay a time at which each fan-out wire outputs a data signal according to the fan-out compensation duration of each fan-out wire, so that the fan-out delay durations of all fan-out wires are same;

the delay control module is further configured to obtain a start compensation duration of each fan-out wire according to a gear adjustment duration corresponding to the start adjustment gear before compensating the fan-out delay duration of the fan-out wire, and delay a time at which each fan-out wire outputs a data signal according to the start compensation duration of each fan-out wire, so that after all pixels controlled by all fan-out wires are turned on by each scan line, all fan-out wires start to output data signals;

the delay control module comprises a unit delay duration unit, a gear adjustment duration unit, and a delay control unit connected in sequence;

the unit delay duration unit is configured to set a unit fan-out delay duration and a unit start delay duration;

the gear adjustment duration unit is configured to acquire a gear adjustment duration corresponding to the fan-out adjustment gear according to the unit fan-out delay duration and the fan-out adjustment gear, and to acquire a gear adjustment duration corresponding to the start adjustment gear according to the unit start delay duration and the start adjustment gear; and the delay control unit is configured to acquire the start compensation duration of each fan-out wire according to the gear adjustment duration corresponding to the start adjustment gear, delay a time at which each fan-out wire outputs the data signal according to the start compensation duration of each fan-out wire, and acquire the fan-out compensation duration of each fan-out wire according to the gear adjustment duration corresponding to the fan-out adjustment gear, and delay the time at which each fan-out wire outputs the data signal according to the fan-out compensation duration of each fan-out wire.

14. The signal delay adjustment device according to claim 13, wherein a relationship between the maximum fan-out compensation duration and the fan-out adjustment gear is as follows:

$$t=n*ui*\mathrm{gear}$$

wherein t is the maximum fan-out compensation duration, n is the number of fan-out wires, ui is a unit fan-out delay duration, gear is a fan-out adjustment gear, and ui*gear is the gear adjustment duration corresponding to the fan-out adjustment gear;

a relationship between the maximum start compensation duration and the start adjustment gear is as follows:

$$t'=n*ui'*\mathrm{gear}'$$

wherein t' is the maximum start compensation duration, n is the number of fan-out wires, ui' is a unit start delay duration, gear' is the start adjustment gear, and ui'*gear' is the gear adjustment duration corresponding to the start adjustment gear.

15. The signal delay adjustment device according to claim 14, wherein the gear setting module sets and selects the fan-out adjustment gear according to the maximum fan-out compensation duration and the number of fan-out wires, comprising:

setting the unit fan-out delay duration according to a data transmission period of the data signal;

setting a plurality of the fan-out adjustment gears and the gear adjustment duration of each of the fan-out adjustment gears according to the unit fan-out delay duration;

determining a maximum fan-out adjustment duration corresponding to each fan-out adjustment gear according to the gear adjustment duration corresponding to each fan-out adjustment gear and the number of fan-out wires; and selecting the fan-out adjustment gear corresponding to the maximum fan-out adjustment duration that is same as the maximum fan-out compensation duration as the fan-out adjustment gear required.

16. The signal delay adjustment device according to claim 14, wherein the gear setting module sets and selects the start adjustment gear required according to the maximum start compensation duration and the number of fan-out wires, specifically comprising:

setting the unit start delay duration according to a data transmission period of the data signal;

setting a plurality of the start adjustment gears and the gear adjustment duration corresponding to each start adjustment gear according to the unit start delay duration;

determining a maximum start adjustment duration corresponding to each start adjustment gear based on the gear adjustment duration corresponding to each start adjustment gear and the number of fan-out wires; and selecting the start adjustment gear corresponding to the maximum start adjustment duration that is same as the maximum start compensation duration as the start adjustment gear required.

* * * * *